US007539673B2

(12) United States Patent
Trowbridge (10) Patent No.: US 7,539,673 B2
(45) Date of Patent: May 26, 2009

(54) SYSTEM AND METHOD OF RE-ORDERING SEARCH RESULTS BASED ON PRIOR USER ACTIONS

(75) Inventor: Jon Eric Trowbridge, Chicago, IL (US)

(73) Assignee: Novell, Inc., Provo, UT (US)

( * ) Notice: Subject to any disclaimer, the term of this patent is extended or adjusted under 35 U.S.C. 154(b) by 460 days.

(21) Appl. No.: 11/471,628

(22) Filed: Jun. 21, 2006

(65) Prior Publication Data
US 2007/0033171 A1    Feb. 8, 2007

Related U.S. Application Data

(63) Continuation-in-part of application No. 11/229,628, filed on Sep. 20, 2005, now Pat. No. 7,440,948, and a continuation-in-part of application No. 11/195,754, filed on Aug. 3, 2005, now Pat. No. 7,184,939, and a continuation-in-part of application No. 11/195,731, filed on Aug. 3, 2005.

(60) Provisional application No. 60/706,009, filed on Aug. 8, 2005.

(51) Int. Cl.
*G06F 17/30* (2006.01)
(52) U.S. Cl. ....................................................... 707/3
(58) Field of Classification Search ............ 707/2, 707/3; 709/224
See application file for complete search history.

(56) References Cited
U.S. PATENT DOCUMENTS

| | | | |
|---|---|---|---|
| 4,897,782 A | 1/1990 | Bennett et al. | 364/200 |
| 5,287,504 A | 2/1994 | Carpenter et al. | 395/600 |
| 5,577,241 A | 11/1996 | Spencer | 395/605 |
| 5,864,848 A | 1/1999 | Horvitz et al. | 707/6 |
| 6,081,750 A | 6/2000 | Hoffberg et al. | 700/17 |
| 6,272,455 B1 | 8/2001 | Hoshen et al. | 704/1 |
| 6,272,507 B1 | 8/2001 | Pirolli et al. | 707/513 |
| 6,349,137 B1 | 2/2002 | Hunt et al. | 379/265.06 |
| 6,400,996 B1 | 6/2002 | Hoffberg et al. | 700/83 |
| 6,480,881 B1 | 11/2002 | Kubota et al. | 709/202 |
| 6,647,383 B1 | 11/2003 | August et al. | 707/3 |
| 6,775,665 B1 | 8/2004 | Piersol | 707/4 |
| 6,931,593 B1 | 8/2005 | Grooters | 715/717 |
| 6,996,778 B2 | 2/2006 | Rajarajan et al. | 715/734 |
| 7,188,317 B1 | 3/2007 | Hazel | 715/804 |
| 7,213,040 B1 | 5/2007 | Stokes et al. | 707/203 |
| 7,437,358 B2 | 10/2008 | Arrouye et al. | 707/4 |
| 7,487,146 B2 | 2/2009 | Friedman | 707/4 |
| 2002/0068558 A1 | 6/2002 | Janik | 455/422 |

(Continued)

OTHER PUBLICATIONS

Microsoft, Outlook 2003 Screenshots, Copyright 2003, 9 pages.

(Continued)

*Primary Examiner*—Etienne P LeRoux
(74) *Attorney, Agent, or Firm*—Pillsbury Winthrop Shaw Pittman LLP (57) ABSTRACT

The invention is directed to a system and method of reordering conventional search results provided by a remote search engine such as Google. The invention may leverage a chronological timeline of user action information to infer relationships between objects in a search result. The search result reordering process does not require direct interaction by the user.

16 Claims, 5 Drawing Sheets

U.S. PATENT DOCUMENTS

| | | | |
|---|---|---|---|
| 2002/0069059 A1 | 6/2002 | Smith | 704/257 |
| 2002/0087649 A1 | 7/2002 | Horvitz | 709/207 |
| 2002/0143860 A1 | 10/2002 | Catan | 709/203 |
| 2002/0147805 A1 | 10/2002 | Leshem et al. | 709/223 |
| 2002/0174134 A1 | 11/2002 | Goykhman | 707/104.1 |
| 2003/0018634 A1 | 1/2003 | Shringeri et al. | 707/4 |
| 2003/0099399 A1 | 5/2003 | Zelinski | 382/186 |
| 2004/0030753 A1 | 2/2004 | Horvitz | 709/206 |
| 2004/0049494 A1 | 3/2004 | Kottisa | 707/3 |
| 2004/0049512 A1 | 3/2004 | Kawakita | 707/100 |
| 2005/0114374 A1 | 5/2005 | Juszkiewicz et al. | 707/101 |
| 2005/0188174 A1 | 8/2005 | Guzak et al. | 711/203 |
| 2006/0010120 A1 | 1/2006 | Deguchi et al. | 707/4 |
| 2006/0156246 A1 | 7/2006 | Williams et al. | 715/764 |
| 2006/0221235 A1 | 10/2006 | Kusumoto | 348/553 |
| 2006/0224938 A1* | 10/2006 | Fikes et al. | 715/500 |
| 2007/0033220 A1 | 2/2007 | Drucker et al. | 707/103 R |
| 2007/0094292 A1 | 4/2007 | Kataoka | 707/102 |

OTHER PUBLICATIONS

Corbet, "Watching Filesystem Events with Inotify", Sep. 29, 2004, available online: <http://lwn.net/Articles/104343/>, 5 pages.

Otto Bruggeman, [Patch]kdirwatch.cpp, Sep. 21, 2002, kde-core-devel list http://lists.kde.org/?l=kde-core-devel&m=103265283012353&w=2, 2 pages.

Josef Weidendorfer, Re:[Patch] kdirwatch.cpp, Sep. 23, 2002, kde-core-devel list http://lists.kde.org/?l=kde-core-devel&m=103279747704133&w=2, 1 page.

Sven Radej, "class KDirWatch", 2003, <http://api.kde.org/3.1-api/classref/kio/KDirWatch.html>.

* cited by examiner

SYSTEM AND METHOD OF RE-ORDERING SEARCH RESULTS BASED ON PRIOR USER ACTIONS

CROSS-REFERENCE TO RELATED APPLICATIONS

This application claims the benefit of U.S. Provisional Application entitled "System and Method of Analyzing a Timeline and Performing Search Functions", No. 60/706,009, filed Aug. 8, 2005, and the present application is also a continuation-in-part of U.S. application Ser. No. 11/195,754 entitled "System and Method of Implementing User Action Monitoring to Automatically Populate Object Launchers", filed Aug. 3, 2005 now U.S. Pat. No. 7,184,939 by Jon Eric Trowbridge and Nathaniel Dourif Friedman; and U.S. application Ser. No. 11/195,731 entitled "System and Method of Searching for Information Based on Prior User Actions", filed Aug. 3, 2005 by Jon Eric Trowbridge and Nathaniel Dourif Friedman; and U.S. application Ser. No. 11/229,628 entitled "System and Method of Associating Objects in Search Results", filed Sep. 20, 2005 now U.S. Pat. No. 7,440,948 by Jon Eric Trowbridge and Nathaniel Dourif Friedman. The entire contents of the above mentioned applications are hereby incorporated by reference for all purposes.

BACKGROUND

1. Field of the Invention

This invention relates to a system and method of observing actions performed on a computer and processing information that corresponds to the observed actions. In particular, the invention is directed to re-ordering search results based on information corresponding to the observed actions.

2. Background Information

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications are deficient because they do not enable searching for events and/or objects based on the observed actions.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. Objects may include information such as personal information, user data and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a correlation determining system is provided that analyzes information associated with the user initiated actions that relate to these objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value.

According to another embodiment of the invention, information corresponding to user initiated actions may be analyzed to reorder the search result objects based on user action data relevant to the search. In particular, the search result objects may be reordered based on associations inferred from the user actions, such that the order of search results is customized to a particular user. The system may reorder the search result objects when a threshold value is attained. Further, the system may reorder the search result objects without direct intervention from the user.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
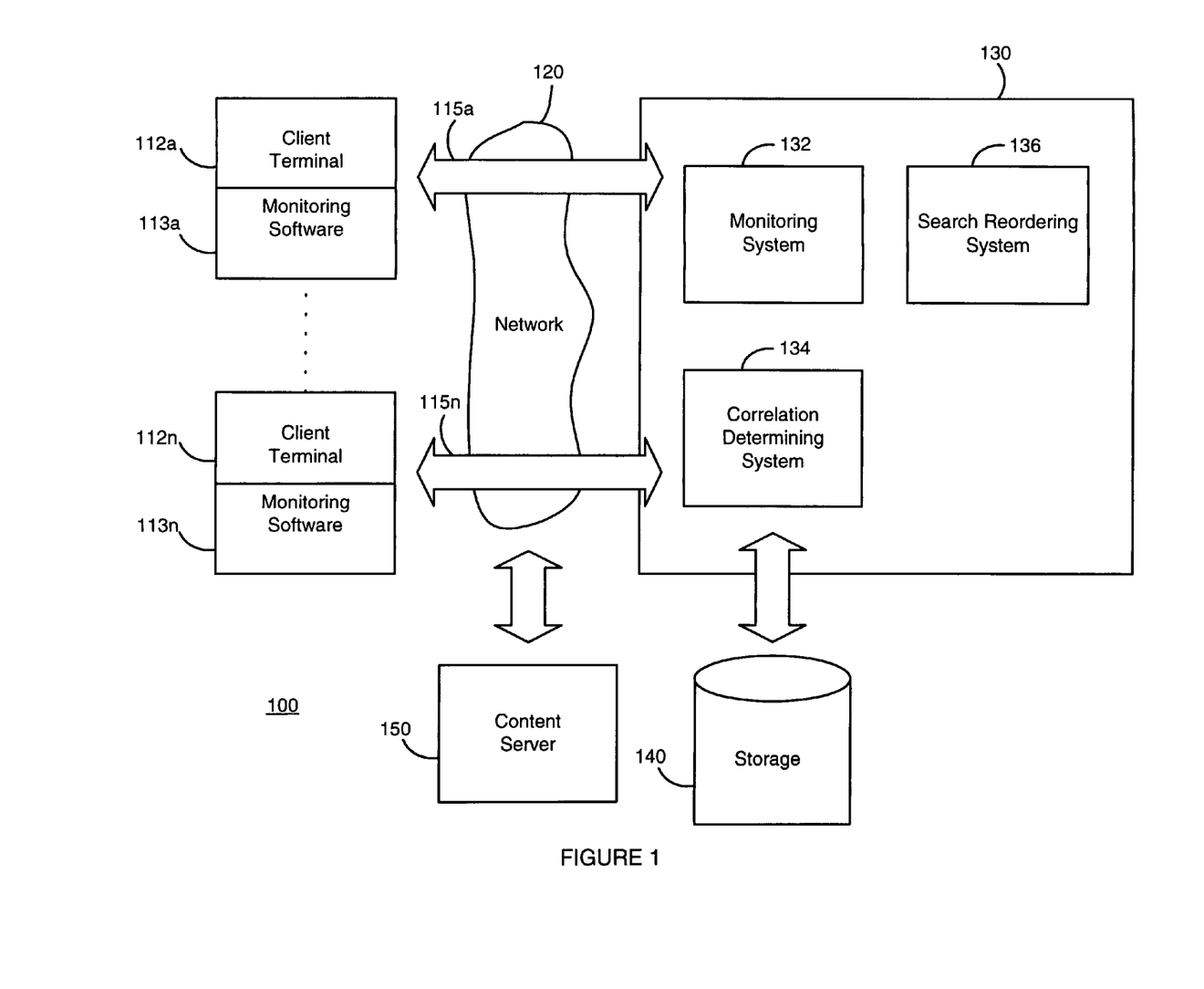
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information such as personal information, user data, or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and/or other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening a website in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single-application may also observe and organize computer initiated actions including, for example, generating a reminder, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
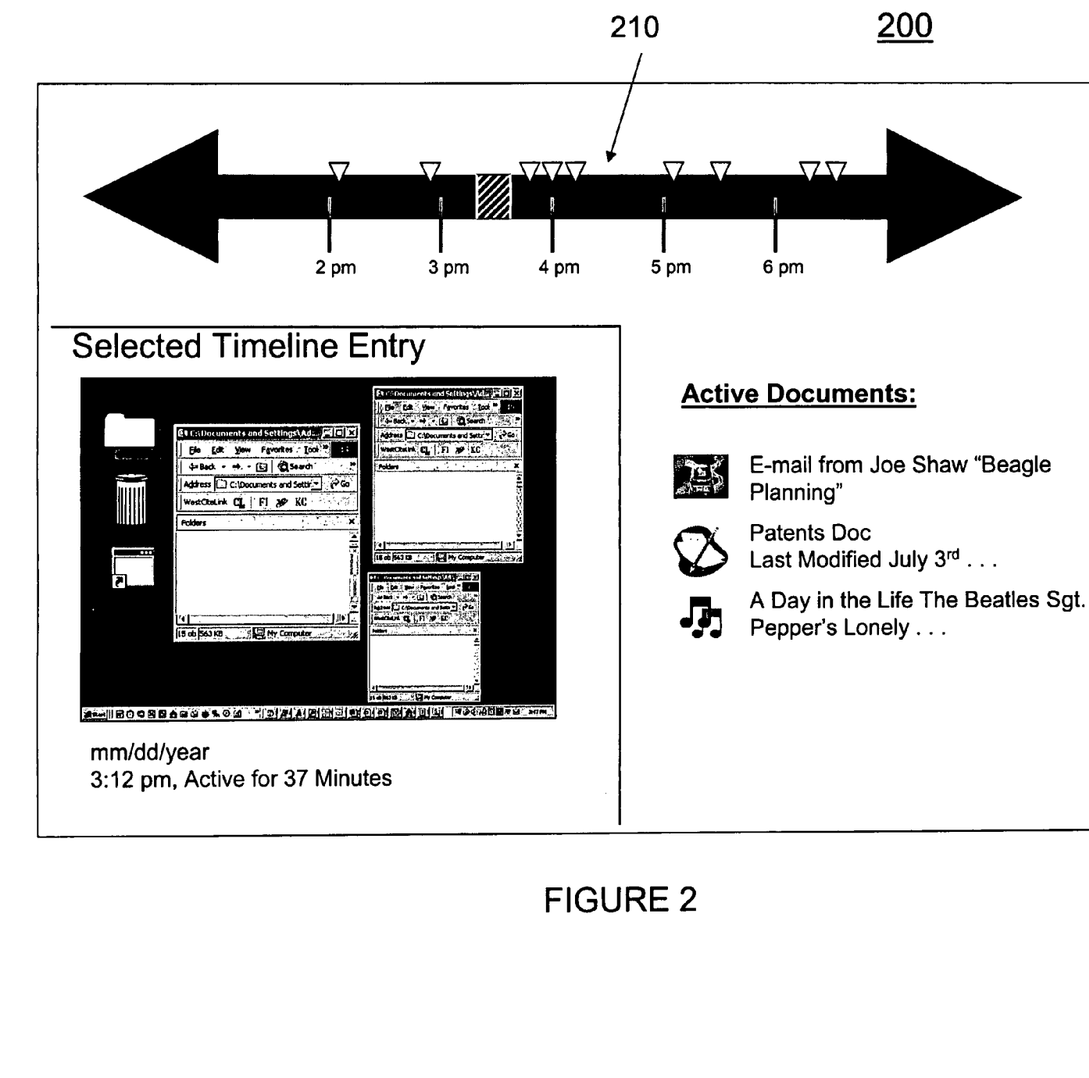
FIG. 2 illustrates an exemplary embodiment of a timeline according to an embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as, screenshots, dates that objects are accessed, times that objects are accessed, lengths of time that objects are active, and/or other information. Display 200 may also include a portion 230 that lists active objects. In another embodiment of the invention, information may be organized and displayed according to other configurations.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3:
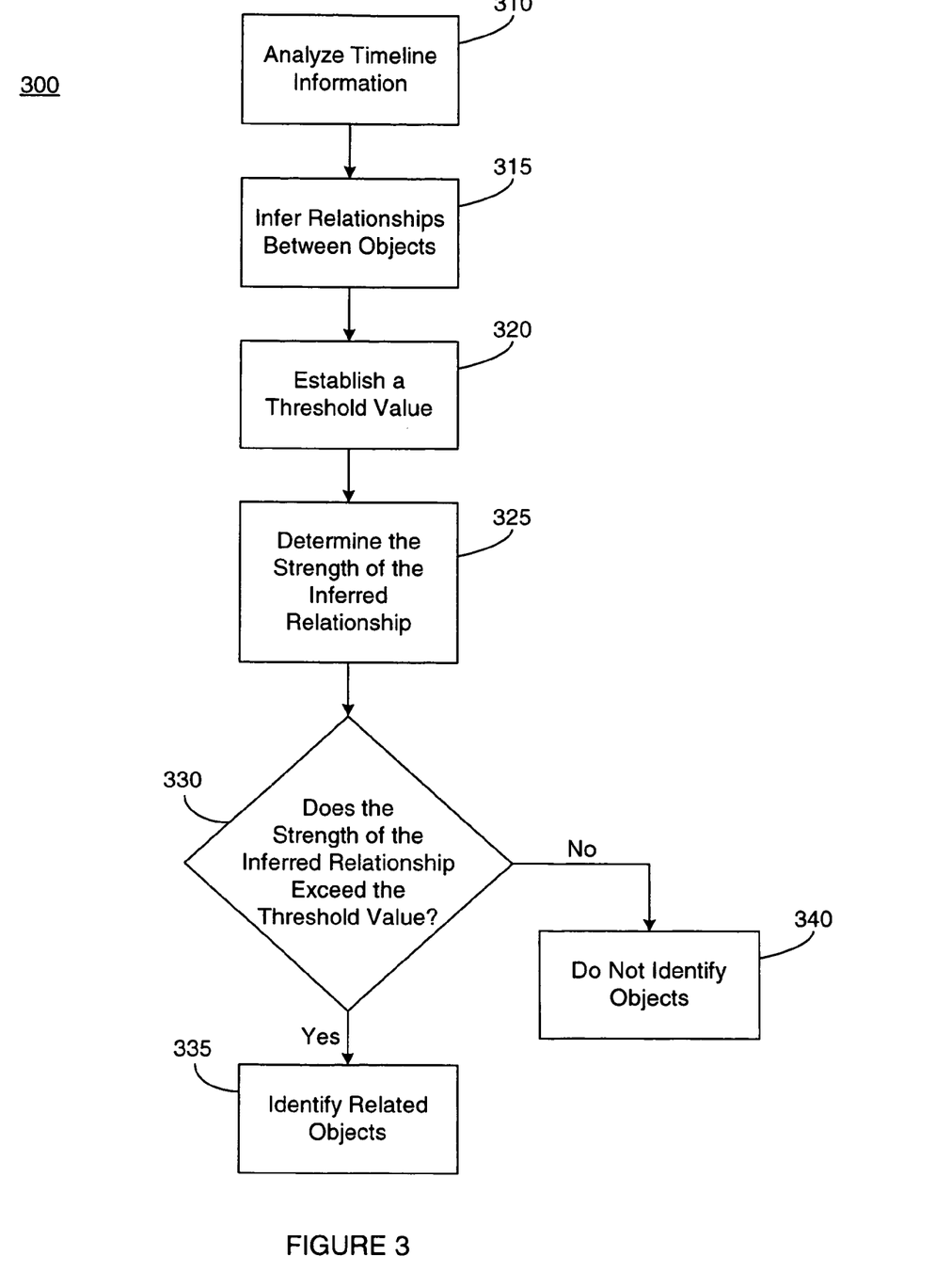
FIG. 3 illustrates a flow chart schematic for analyzing relationships between objects according to an embodiment of the invention.

According to another embodiment of the invention, information corresponding to user initiated actions and computer initiated actions may be analyzed by correlation determining system 134. FIG. 3 illustrates a flow diagram 300 of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters derived from information associated with the user initiated actions relating to these objects including, for example, a temporal order in which the objects are accessed, focus toggling between the first object and the third object, opening the first object contemporaneously with the third object, or other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors associated with the user initiated actions and the computer initiated actions. According to one embodiment of the invention, the relevance may be provided with a value based on factors including, for example, a frequency of the user initiated actions, simultaneous/sequential occurrence of user initiated action, a duration of user initiated actions, overall chronological proximity of user initiated actions, and/or other factors.

In operation 330, the strength of the relationships derived from the factors may be compared to the threshold value. In operation 335, relationships between objects may be identified if the strength of the relationship is determined to exceed a predefined threshold value. Alternatively, in step 340, relationships between objects may not be identified if the strength of the relationship is determined to be below a predefined threshold value. One of ordinary skill in the art will readily appreciate that other techniques may be used to determine the strength of relationships between objects. According to another embodiment of the invention, correlation determining system 134 may analyze parameters derived from information associated with user initiated actions and/or computer initiated actions to discover relationships between objects.

According to one embodiment of the invention, correlation determining system 134 may analyze parameters derived from information associated with user initiated actions and/or computer initiated actions to discover relationships between objects. Thus, according to one embodiment of the invention, relationships may be discovered without considering content of the objects. In an alternative embodiment of the invention, a combination of content-searching and an analysis of parameters derived from information associated with user initiated actions and/or computer initiated actions may be used to discover relationships between objects. By contrast, in the example discussed above, known systems that only rely on content-based searching to discover relationships between objects would not identify that the first object (i.e., an email message) is related to the third object (i.e., a word processing document), if the first object and the third object include different content (e.g., terminology).

According to another embodiment of the invention, user action information obtained by the timeline may be used to generate customized search results for a particular user. A user may access several objects during a session that relate to a particular concept. For example, the user may be interested in purchasing a portable computer. The user may receive an email message from an online retailer offering substantial discounts for purchasing a portable iBook from Apple Computers during a specified time period. In reaction to the email, the user may access the Internet to research the iBook specifications. To conduct the Internet search, the user may simply enter the search term "apple" in a remote search engine (e.g., Google).

Known search engines perform content-based searches and display search results using ranking criteria established by the remote search engine. Thus, searching for "apple" on known search engines may return objects that include information for apple fruit, apple recipes, people having the last name of Apple, apple computers, and other apple information. A majority of the search result objects associated with the search for "apple" may not be relevant to the intended search for Apple Computers. Furthermore, the search result objects that receive the highest ranking from known search engines may be for food products rather than computers.

Figure 4:
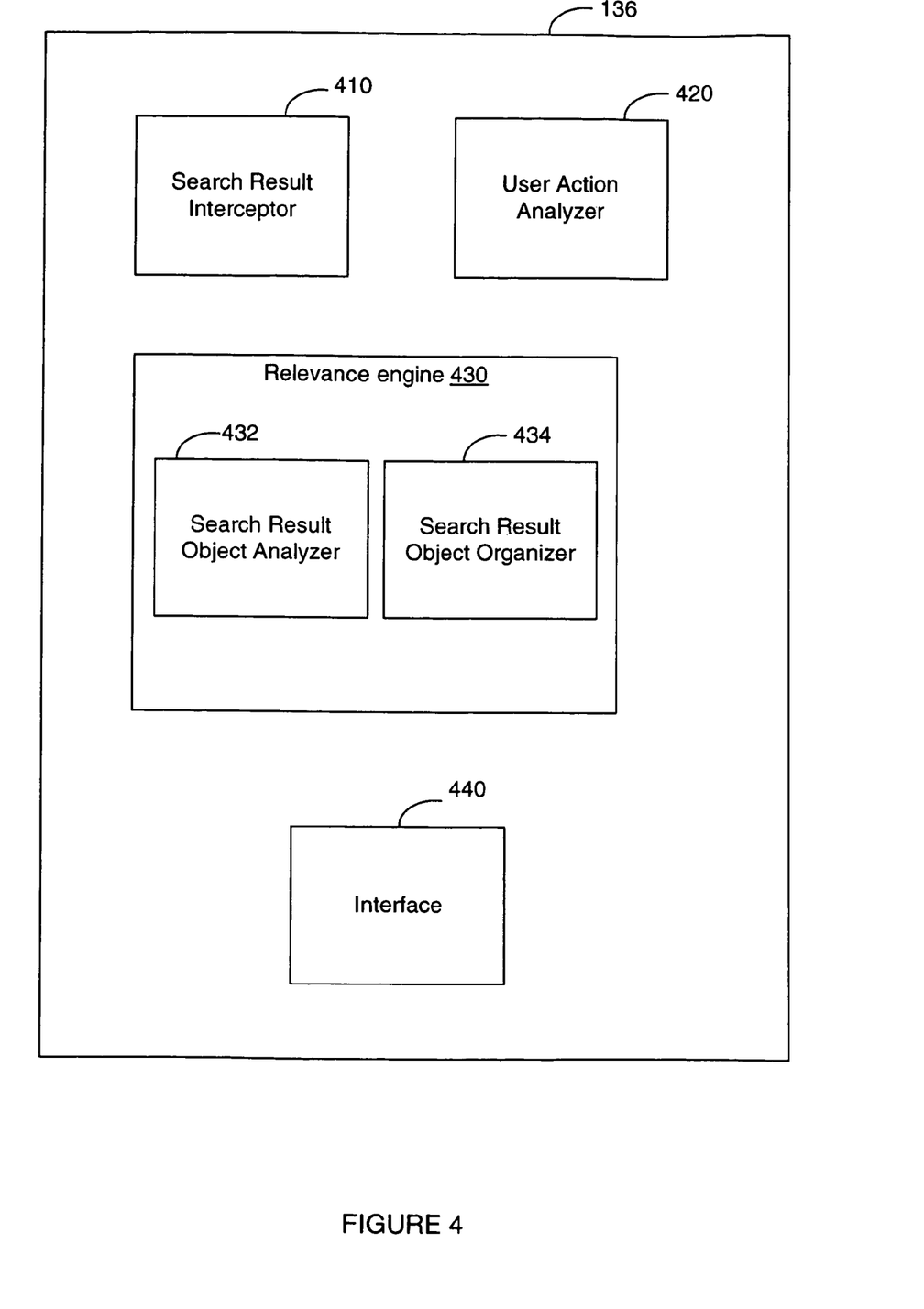
FIG. 4 illustrates an exemplary embodiment of a search system according to an embodiment of the invention.

According to another embodiment of the current invention, a search reorder system 136 may provide search results in order of relevance to the user based on a chronological history of the user's actions. Monitoring software 113 and/or monitoring system 132 may be leveraged to reorder the search results.

As shown in FIG. 4, search reorder system 136 includes search result interceptor 410 that intercepts an initial (e.g., conventional) search result performed by a user on a web search engine. A user action analyzer 420 communicates with search result interceptor 410 and monitoring software 113 and/or monitoring software 132 to identify user action information initiated by that user proximate in time to the user's web search or web browser launching. A point in time associated with a web search may be derived from receipt of a communication from search result interceptor 410 (e.g., the web search occurring at approximately the same time as the communication). Alternatively or in addition there to, a point in time associated with a web search may be determined by analyzing the chronological user action data recorded monitoring software 113 and/or monitoring software 132 to identify a time of a most recent web browser launching.

Once a point in time is determined, user action analyzer 420 identifies user action information for a time period (e.g., days, hours, minutes, and seconds) proximate thereto. In a preferred embodiment, the predetermined time period occurs prior to the identified point in time. However, in an alternative embodiment, the predetermined time period encompasses the identified point in time. User action analyzer 420 identifies the user actions (and associated information) initiated by the user during the predetermined time period and maintains them in the chronological order recorded by monitoring software 113 and/or monitoring software 132.

Information from the search result interceptor 410 and the user action analyzer 420 is provided to a relevance engine 430, which analyzes and reorders the initial, conventional search result to form a final search result that is customized to the user. Relevance engine 430 includes a search result object analyzer 432 and a search result object organizer 434. Search result object analyzer 432 compares the user action information identified by user action analyzer 420 with objects in the search results intercepted by search result interceptor 410 to see if a user action performed prior to the website corresponds to an object in the initial search list. A relevancy value of each object in the search list may be assigned by search result object analyzer 432. The relevancy value may correspond to relevant or irrelevant, or it may include a more precise or numeric value or adjustment.

In a preferred embodiment of the invention, the intercepted search results include extra metadata that may help disambiguate the search results. In particular, the search engine may tag results as belonging to different clusters, thereby indicating that a searched object has multiple meanings or interpretations. Also, the search engine may provide disambiguating text associated with each cluster.

For example, a search of the term "apple" may return search results that are tagged with disambiguating text as belonging to three different clusters, such as "fruit," "computer," and "beetles." Search result object analyzer 432 compares or cross-references each object (e.g., "fruit," "computer," and "beetles") against the stored user initiated actions to identify a match. In a preferred embodiment of the invention, search result object analyzer 432 also determines chronological positions of matching objects and their frequency of access. Based upon the existence of any matches, chronological position of the matching objects and a frequency of a match among the user data, search object analyzer 432 computes a numerical score for each of the three categories. In a preferred embodiment of the invention, numerical rankings indicating relevancy provided by the remote search engine are adjusted according to the numerical score calculated by search object analyzer 432. After adjusting the numerical rancings, the results are resorted and displayed.

In a preferred embodiment of the present invention, search result object analyzer 432 cross-references or compares each object in the initial search list with user action information. As alluded to above, in one embodiment, matches or correlations between user action that occur close in time to a web search are given greater weight or a higher relevancy value than matches that occur further in time. In another embodiment, matches are given the same weight, regardless of their position in time. According to a preferred embodiment of the invention, an object's relevancy value increases in accordance with the number of user actions (e.g., frequency) that correspond to the object. For example, a first object in the initial search report that corresponds to two user actions may have a greater relevancy value than a second object that corresponds to one user action.

In an alternative embodiment of the present invention, search result object analyzer 432 only compares the identified user actions with each object in the initial search list until it reaches a match. In particular, search result object analyzer 432 first compares the most recent user action identified by user action analyzer 420 with each object in the search result. If there is a suitable correlation between the user object and at least one object in the search results, search result object analyzer 432 stops. Otherwise, search object analyzer 432 continues along the chronological list of identified user actions until a suitable correlation is found or the chronological list of identified user actions is exhausted.

An interface 440 may be provided to display the reordered search list to the user. The interface may include a video monitor or other device that is capable of displaying information. While separate components are illustrated in the embodiment shown in FIG. 4, one of ordinary skill in the art will readily appreciate that one or more components may be configured to perform these functions and that the functions may be performed using software or hardware components. As one example, correlation determining system 134 may be configured to perform the additional functionality of relevance engine 430.

Figure 5:
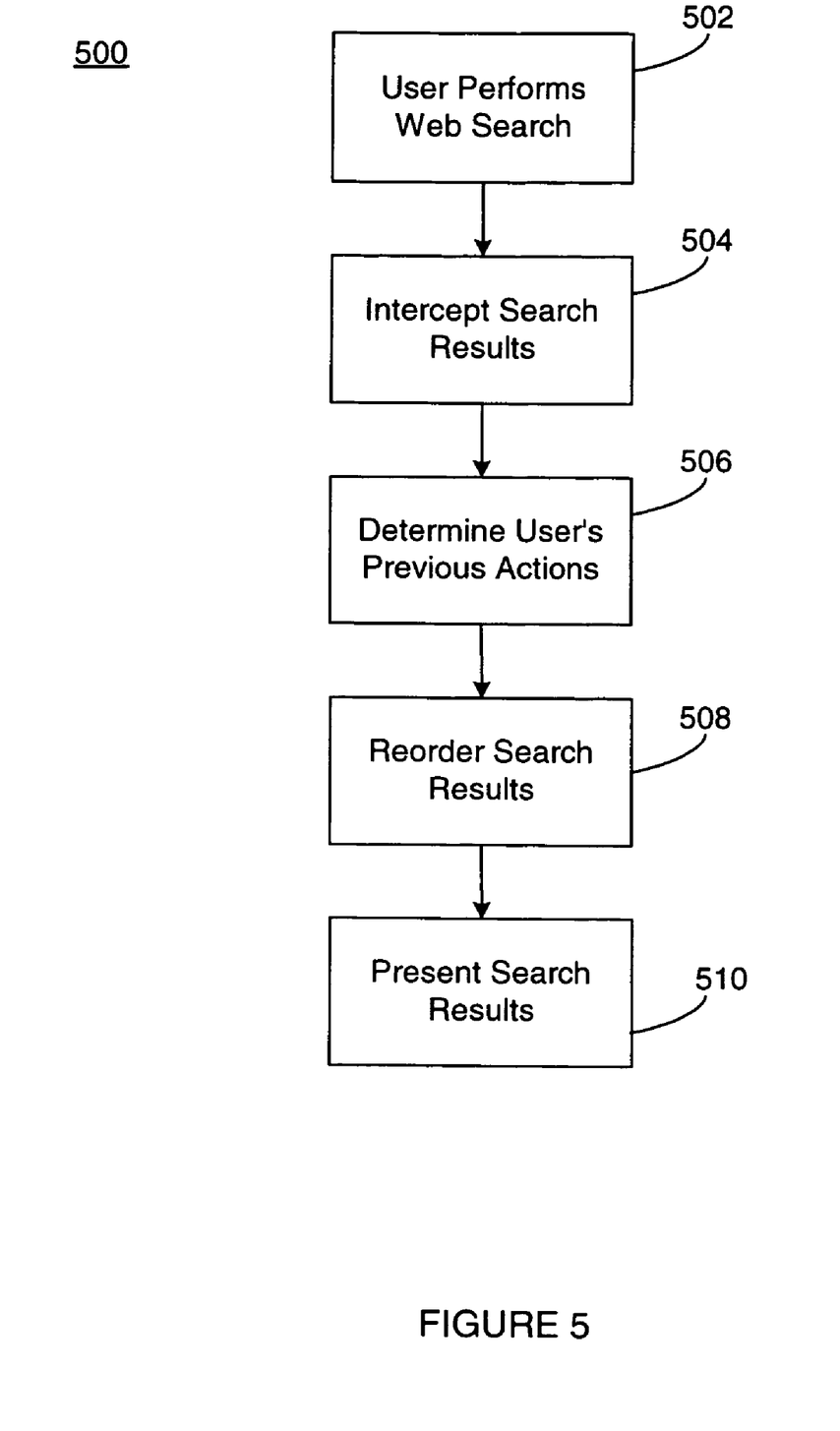
FIG. 5 illustrates a flow chart schematic for performing searches according to an embodiment of the invention.

FIG. 5 depicts a process 500 for reordering search results, according to embodiments of the invention. In operation 502, a user may perform a web search for a specific object. The search may be performed using any known web search engine such as, for example, Google, Yahoo, and/or other search engines. The search may include one or more keywords for which the user is interested in obtaining relevant information.

Upon receipt of initial search results from the web search engine, the system may intercept the results in operation 504. As described above, a simple search for the term "apple" may result in a return of information related to many subject areas. Rather than presenting the disparate information to the user, the search reordering system intercepts the information in order to customize it to the user's interest.

In operation 506, user actions performed by the user for a predetermined time period (e.g., days, hours, minutes, seconds, etc.) before the web search are identified. According to an exemplary embodiment of the invention, the system may determine what actions were performed by the user proximate in time to when the web browser or particular web search was launched.

Based upon the identified user actions, the search results are analyzed and reordered in operation 408. For example, the system may determine that the user read an email offering a discount on an iBook form Apple Computers prior to launching the web browser. Based on this information, the system may determine that the user is interested in obtaining search results related to Apple Computers, rather than food or other non-computer related content and reorder the search results accordingly. Similarly, a user may perform a web search on apple prior to a web search on computer. Based on this information, the system may determine that the user is interested in obtaining information regarding Apple Computers, rather than other vendors of computers or other content associated with computers, and arrange the search results accordingly. Other indicators may be used, as would be apparent.

A relevance engine 430 may be provided to analyze the chronological history of user actions and automatically compare data from the initial search results and the user actions. The relevance engine may automatically reorder the search results to decrease the relevance of objects that are not associated with the user's actions. Following the apple example, the relevance engine may decrease the relevance of objects associated with food. Similarly, it may increase the relevance of objects associated with a portable iBook from Apple computers or Apple computers.

In operation 510, the reordered search results may be provided to the user. According to some embodiments of the invention, all initial search results may be provided to the user in customized relevance order. In other embodiments, only those results related to the user's previous actions may be displayed. According to some embodiments of the invention, the system may enable the user to determine whether to receive all results in customized relevance order or only selected results.

According to some embodiments, the relevance engine may establish a threshold value for deciding whether or not to reorder the search results or to provide the search results to the user. For example, the relevance engine may establish a threshold value for deciding whether or not to reorder the search results or to provide the search results to the user. More particularly, in some instances a user-actions performed before the web browser is launched or a current search is performed may not relate to the current search. In this instance, a relevance engine may find a low relevance value between the user-action and the search results, such that the relevance value does not meet the threshold value. When the threshold is not met, the system may display the search results to the user without any reordering.

In another embodiment of the invention, the threshold value is determined by determining whether a user action object ranks within upper-ranked search result objects in the initial search result. For example, a user action that correlates with a search result object listed on a third page of an initial search result (or with no search result object) may not be used to reorder the initial search result.

When the threshold is obtained, the search results may be reordered and provided to the user. Thus, the reordering process does not require direct intervention from the user to reorder search results.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method for displaying search results, comprising:
   intercepting search results that result from a search performed by a user, wherein the intercepted search results include a plurality of search result objects;
   determining a chronological timeline of actions initiated by the user proximately in time to the search performed by the user, wherein the user-initiated actions each occur at a respective chronological position in the chronological timeline;
   inferring one or more relationships between the plurality of search result objects and the user-initiated actions in the chronological timeline;

determining a relevancy value for one or more of the plurality of search result objects that are associated with one or more of the inferred relationships, wherein the relevancy value is based on a temporal proximity between the search performed by the user and the chronological position of the user-initiated actions associated with the inferred relationships;

reordering the intercepted search results based on the relevancy value determined for the one or more search result objects associated with the inferred relationships, wherein the reordered search results provide an increased relevance to the one or more search result objects associated with the inferred relationships; and displaying the reordered search results to the user.

2. The method of claim 1, further comprising identifying a point in time when the search was performed by the user, wherein the user-initiated actions in the determined chronological timeline occurred during a time period prior to the identified point in time.

3. The method of claim 2, wherein the temporal proximity is relative to the identified point in time when the search was performed by the user.

4. The method of claim 3, wherein determining the relevancy value for the one or more search result objects associated with the inferred relationships includes:

identifying one or more matches among the user-initiated actions in the chronological timeline for each of the one or more search result objects, wherein the matching user-initiated actions each occur at a respective chronological position in the timeline; and determining the relevancy value for the one or more search result objects based on a temporal proximity of the chronological position of the matching user-initiated actions and the identified point in time when the search was performed by the user.

5. The method of claim 1, wherein inferring the relationships between the plurality of search result objects and the user-initiated actions in the chronological timeline includes:

determining a plurality of different clusters that indicate multiple possible meanings or interpretations for the plurality of search result objects;

identifying one or more matches among the user-initiated actions in the chronological timeline for each of the plurality of different clusters, wherein the matching user-initiated actions each occur at a respective chronological position in the timeline; and computing a numerical score for each of the plurality of different clusters, wherein the numerical score is based on a frequency of the matches among the user-initiated actions and the chronological position of the matching user-initiated actions.

6. The method of claim 5, wherein the relevancy value for the search result objects associated with the inferred relationships is based on the numerical score computed for the plurality of different clusters.

7. The method of claim 1, wherein the reordered search results provide a decreased relevance to one or more of the plurality of search result objects that are not associated with one or more of the inferred relationships.

8. The method of claim 1, wherein determining the relevancy value for the one or more search result objects associated with the inferred relationships includes:

identifying a frequency of matches among the user-initiated actions in the chronological timeline for each of the one or more search result objects; and determining the relevancy value for the one or more search result objects based on the frequency of the matches.

9. A system for displaying search results, comprising:

a search result interceptor configured to intercept search results that result from a search performed by a user, wherein the intercepted search results include a plurality of search result objects;

a user action analyzer configured to determine a chronological timeline of actions initiated by the user proximately in time to the search preformed by the user, wherein the user-initiated actions each occur at a respective chronological position in the chronological timeline;

a correlation determining system configured to infer one or more relationships between the plurality of search result objects and the user-initiated actions in the chronological timeline;

a relevance engine configured to determine a relevancy value for one or more of the plurality of search result objects that are associated with one or more of the inferred relationships, wherein the relevancy value is based on a temporal proximity between the search performed by the user and the chronological position of the user-initiated actions associated with the inferred relationships;

a search result object organizer configured to reorder the intercepted search results based on the relevancy value determined, for the one or more search result objects associated with the inferred relationships, wherein the reordered search results provide an increased relevance to the one or more search result objects associated with the inferred relationships; and a display mechanism configured to display the reordered search results to the user.

10. The system of claim 9, wherein the user action analyzer is further configured to identify a point in time when the search was performed by the user, wherein the user-initiated actions in the determined chronological timeline occurred during a time period prior to the user identified point in time.

11. The system of claim 10, wherein the temporal proximity is determined relative to the identified point in time when the search was performed by the user.

12. The system of claim 11, wherein the correlation determining system includes a search result object analyzer configured to:

identify one or more matches among the user-initiated actions in the chronological timeline for each of the one or more search result objects, wherein the matching user-initiated actions each occur at a respective chronological position in the timeline; and determine the relevancy value for the one or more search result objects based on a temporal proximity of the chronological position of the matching user-initiated actions and the identified point in time when the search was performed by the user.

13. The system of claim 9, wherein the correlation determining system includes a search result object analyzer configured to:

determine a plurality of different clusters that indicate multiple possible meanings or interpretations for the plurality of search result objects;

identify one or more matches among the user-initiated actions in the chronological timeline for each of the plurality of different clusters, wherein the matching user-initiated actions each occur at a respective chronological position in the timeline; and compute a numerical score for each of the plurality of different clusters, wherein the numerical score is based on a frequency of the matches among the user-initiated actions and the chronological position of the matching user-initiated actions.

14. The system of claim 13, wherein the relevancy value for the search result objects associated with the inferred relationships is based on the numerical score computed for the plurality of different clusters.

15. The system of claim 9, wherein the reordered search results provide a decreased relevance to one or more of the plurality of search result objects that are not associated with one or more of the inferred relationships.

16. The system of claim 9, wherein the correlation determining system includes a search result object analyzer configured to:
   identify a frequency of matches among the user-initiated actions in the chronological timeline for each of the one or more search result objects; and
   determine the relevancy value for the one or more search result objects based on the frequency of the matches.

\* \* \* \* \*